United States Patent
Wang et al.

(10) Patent No.: US 8,489,870 B2
(45) Date of Patent: Jul. 16, 2013

(54) SYSTEM FOR INITIATING EXECUTION OF BIOS (BASIC INPUT/OUTPUT SYSTEM) BASED ON POSITION OF DISPLAY MEMBER RELATIVE TO BASE MEMBER

(75) Inventors: Lan Wang, Cypress, TX (US); Shab H Madina, Houston, TX (US); Jon G Lloyd, Cypress, TX (US); Harold S Merkel, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

(21) Appl. No.: 12/910,680

(22) Filed: Oct. 22, 2010

(65) Prior Publication Data

US 2012/0102306 A1 Apr. 26, 2012

(51) Int. Cl.
*G06F 9/00* (2006.01)
*G06F 9/24* (2006.01)
*G06F 1/00* (2006.01)

(52) U.S. Cl.
USPC .................................. 713/2; 713/1; 713/300

(58) Field of Classification Search
USPC ............................................................ 713/2
See application file for complete search history.

(56) References Cited

U.S. PATENT DOCUMENTS

| | | | |
|---|---|---|---|
| 5,239,495 A * | 8/1993 | Nanno et al. | 713/321 |
| 5,944,828 A * | 8/1999 | Matsuoka | 713/323 |
| 6,243,819 B1 * | 6/2001 | Jung | 713/320 |
| 6,721,885 B1 | 4/2004 | Freeman et al. | |
| 7,085,871 B2 * | 8/2006 | Haley et al. | 710/303 |
| 7,310,740 B2 | 12/2007 | Price et al. | |
| 7,370,218 B2 * | 5/2008 | Lee | 713/320 |
| 7,480,134 B2 | 1/2009 | Cheng | |
| 2007/0085822 A1 | 4/2007 | Lagnado | |
| 2007/0180282 A1 | 8/2007 | Kim | |
| 2008/0133829 A1 | 6/2008 | Tsuji | |
| 2008/0158188 A1 * | 7/2008 | Tsuji et al. | 345/173 |
| 2009/0083562 A1 | 3/2009 | Park et al. | |

FOREIGN PATENT DOCUMENTS

WO 2006083638 8/2006

* cited by examiner

*Primary Examiner* — Suresh Suryawanshi
(74) *Attorney, Agent, or Firm* — Arthur Ortega

(57) ABSTRACT

A computer device comprising a display member coupled to a base member to enable variable positioning of the display member relative to the base member, and an initiating system to automatically initiate execution of a basic input output system (BIOS) based on a position of the display member relative to the base member.

15 Claims, 3 Drawing Sheets

SYSTEM FOR INITIATING EXECUTION OF BIOS (BASIC INPUT/OUTPUT SYSTEM) BASED ON POSITION OF DISPLAY MEMBER RELATIVE TO BASE MEMBER

BACKGROUND

Computer devices, such as laptop or notebook computers, may contain a basic input/output system (BIOS) which includes software instructions to perform a power-on self-test (POST) to check that the different hardware components in the computer device are working properly. The computer device may include a power switch which when depressed cause the BIOS to begin execution. After successful execution of the POST, the BIOS may proceed to execute instructions to load an operating system (OS) into memory of the computer device. The process of executing the BIOS may make take a relatively long period of time which may not be satisfactory to the user.

BRIEF DESCRIPTION OF THE DRAWINGS

For a more complete understanding of the present embodiments, and the objects and advantages thereof, reference is now made to the following descriptions taken in connection with the accompanying drawings in which.

DETAILED DESCRIPTION

The amount of time a computer device takes to execute a basic input/output system (BIOS) is called boot time. There are several sequential steps in the computer boot process that account for the boot time: The time to execute the BIOS power-on self-test (POST) and time to load the operating system (OS). The boot time may range from 30 seconds to several minutes. It is desirable to reduce the boot time. In one embodiment, provided is a system for initiating execution of BIOS that may reduce boot time. For example, a computer device, such as a notebook computer, may include a display member coupled to a base member to enable variable positioning of the display member relative to the base member. The initiating system can automatically initiate execution of the BIOS based on a position of the display member relative to the base member. That is, the user can simply move the display member to the open position in order to initiate execution of the BIOS. Therefore, instead of having to wait to depress the power switch to initiate execution of the BIOS POST, the display member can be moved to the open position which can trigger the boot process. In other words, the execution of the BIOS may be initiated before the power switch is depressed to power on the computer device. This can be performed in a non intrusive and transparent manner so to not distract a user until the power switch is depressed. If the power switch is not depressed within a predetermined amount of time, the BIOS can automatically power off the computer device and return electronic components of the computer device to the power off state to preserve energy including the battery life of the computer device.

Figure 1:
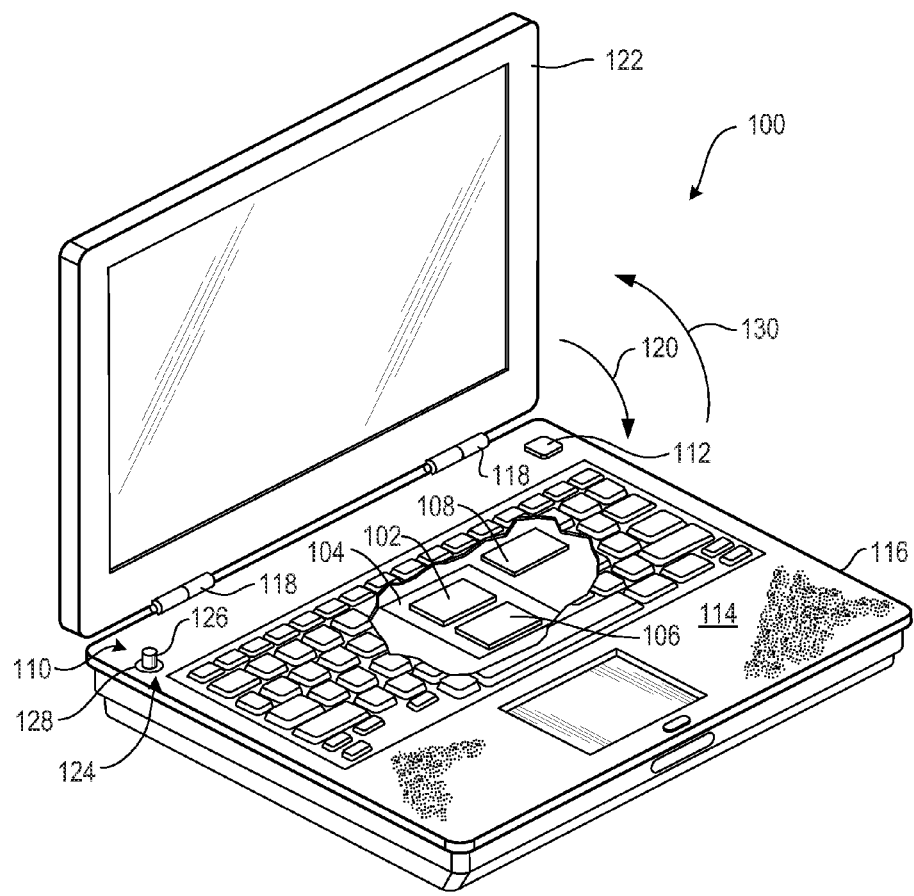
FIG. 1 is a front perspective view of a computer device employing a system for initiating execution of BIOS in accordance with an embodiment.

FIG. 1 is a front perspective view of a computer device 100 employing an embodiment of a system 110 for initiating execution of BIOS 102. In the embodiment illustrated in FIG. 1, computer device 100 comprises a laptop or notebook computer. However, it should be understood that computer device 100 may comprise other types of computer devices such as, but not limited to, tablet personal computers, mobile phones and other types of portable and/or handheld computing devices. In the embodiment illustrated in FIG. 1, computer device 100 comprises a display member 122 rotatably coupled to a base member 116 by hinges 118.

In the embodiment illustrated in FIG. 1, BIOS 102 is disposed within base member 116. However, it should be understood that BIOS 102 may be otherwise located (such as in the display member 122, detachably coupled to the computer device, etc). The BIOS 102 may include software instructions which can be executed when the computer device is powered on when power switch 112 is depressed and/or when initiating system 110 is actuated to initiate execution of the BIOS. The BIOS 102 is configured to determine whether the power switch 112 or the initiating system 110 caused it to begin execution. If the power switch 110 caused the BIOS 102 to initiate execution then the BIOS executes as normal. However, if the initiating system 110 causes the BIOS 102 to initiate execution then the BIOS will check the power switch for a period of time during execution to determine whether to continue execution of the BIOS. The BIOS 102 may contain instructions to perform POST which includes checking that the different hardware components in the computer device (such as keyboard, hard disk drive, graphics video controller, audio controller, display device, communication system, etc) are working properly. In one embodiment, once the BIOS 102 completes successfully completes, it can transfer control to the storage location of the OS 106 (such as the boot sector of a hard disk drive). The BIOS 102 can be stored in memory 104 and executable by processor 108. The BIOS can include legacy BIOS, unified extensible firmware interface (UEFI) and any other BIOS.

The memory 104 may include other instructions executable by processor 108 to control the operation of the computer device 100. For example, memory 104 may store an OS 106 which can include instructions when executed by the processor to control the operation of computer device 100. For example, the OS 106 may include software (programs and data) that can manage the computer hardware and provide common services for execution of various application programs. In one embodiment, the OS 106 can be stored on a hard disk drive or other storage device and then loaded into memory 104 by the BIOS 102 after the completion of the execution of the BIOS 102. The memory 104 is shown disposed in base member 116. However, it should be understood that the memory 104 may be otherwise located (such as in the display member 122, detachably coupled to the computer device 100, etc). Although a single memory component 104 is shown, it should be understood that more than one memory component may be employed by the computer device 100. The memory 104 can comprise a computer-readable medium such as volatile memory (e.g., random access memory, etc.), non-volatile storage (e.g., read only memory, Flash memory, CD ROM, etc.), and combinations thereof.

The processor 108 can be any hardware or logic configured to execute software instructions. The processor 108 is shown disposed in base member 116. However, it should be understood that the processor 108 may be otherwise located (such as in display member 122, detachably coupled to the computer device 100, etc.). Although a single processor 108 is shown, it should be understood that more than one processor may be employed by the computer device 100. For example, the computer device 100 may include a processor for controlling the overall operation of the device and a keyboard controller for controlling the operation of the keyboard. The keyboard controller can be a device which interfaces a keyboard to the computer device. For example, the keyboard controller can inform the computer device when a key is depressed or released. When data from the keyboard arrive, the keyboard controller can raise an interrupt (a keyboard interrupt) to allow the processor to handle the input. In one embodiment, the keyboard controller can handle generate interrupts to the processor in response to actuation of the power switch 112 and the initiating system 110.

In the embodiment illustrated in FIG. 1, the system 110 for initiating execution of the BIOS 102 comprises a switch 124 for detecting a position of display member 122 relative to base member 116. In the embodiment illustrated in FIG. 1, switch 124 comprises a depressable button 126 biased to extend at least partially upward through an opening 128 on a working surface 114 of base member 116 and retract at least partially into base member 116 in response to contact therewith by display member 122 (e.g., contact resulting from display member 122 being moved from an open position as illustrated in FIG. 1 toward and/or into a closed position relative to base member 116 as generally shown by arrow 120). However, it should be understood that button 126 may be otherwise located (e.g., elsewhere on working surface 114, a reversed position where button 126 is located on display member 122, etc.). Further, it should be understood that other devices and/or mechanisms may be used instead of button 126 (e.g., a contact element, mechanical toggle, etc.). In the embodiment illustrated in FIG. 1, the computer device 100 includes power switch 112 disposed on the working surface 114 of base member 116. The power switch 112 can comprise a depressable button which can be actuated or depressed by a user that may cause the computer device 100 to power on. For example, the computer device 100 can respond to the actuation of the power switch 112 by applying power to the electronic components of the device and initiate execution of BIOS 102. As explained below in detail, the computer device 100 can check or monitor the power switch 112 for a predetermined period of time to determine whether to proceed to load the OS 106 into memory 104 after the initiation of the execution of the BIOS 102. It should be understood that power switch 112 may be otherwise located (such as elsewhere on working surface 114, a reversed position where switch 112 is located on display member 122, etc.).

The computer device 100 can be configured to automatically initiate execution of BIOS 102 before the power switch 112 is depressed by a user. For example, in the embodiment illustrated in FIG. 1, in operation, as display member 122 is rotated in the direction indicated by arrow 130 away from base member 116 to an open and/or predetermined position or arrangement relative to base member, display member 122 disengages button 126, thereby actuating switch 124. Actuation of switch 124 causes an interrupt and/or other type of signal to be generated and/or otherwise processed via hardware, software and/or a combination thereof of computer device 100 (e.g., via BIOS 102, OS 106 or other hardware and/or software-based component of computer device 100) to initiate execution of BIOS 102. If the power switch 112 is not depressed by a user within a predetermined period of time after initiation of execution of BIOS 102, then power switch does not transmit a signal indicating that the computer device is to power on causing computer device 100 to power off. The predetermined period of time can be user selectable using any input means such as a keyboard. The predetermined period of time can be any amount such as 60 seconds. Therefore, if the user does not depress the power switch 112 within 10 seconds after initiation of execution of the BIOS 102, then the computer device 100 will be powered off thereby saving battery life. On the other hand, if the power switch 112 is depressed by a user within a predetermined period of time after initiation of execution of BIOS 102, then the power switch transmits a signal indicating that the computer device 100 is to be powered on, in response thereto, the computer device proceeds to load the OS 106 into memory for execution by the processor 108. Thus, in operation, the computer device 100 is capable of automatically initiating execution of BIOS 102 and loading the OS 106 before the power switch 112 is depressed thereby helping to reduce boot time.

In other embodiments, the computer device 100 can be configured to automatically terminate execution of BIOS 102 after initiation of execution of BIOS 102. For example, in operation, as display member 122 is rotated in the direction indicated by arrow 120 toward base member 116 to a closed and/or predetermined position or arrangement relative to base member, display member 122 approaches base member 116 and engages button 126, thereby actuating switch 124. Actuation of switch 124 causes an interrupt and/or other type of signal to be generated and/or otherwise processed via hardware, software and/or a combination thereof of computer device 100 (e.g., via BIOS 102, OS 106 or other hardware and/or software-based component of computer device 100) to terminate execution of BIOS after initiation of execution of BIOS. Thus, in operation, once the computer device 100 is closed (e.g., display member 122 is brought within a predetermined arrangement, distance and/or position relative to base member 116), execution of BIOS 102 can be terminated.

Figure 2:
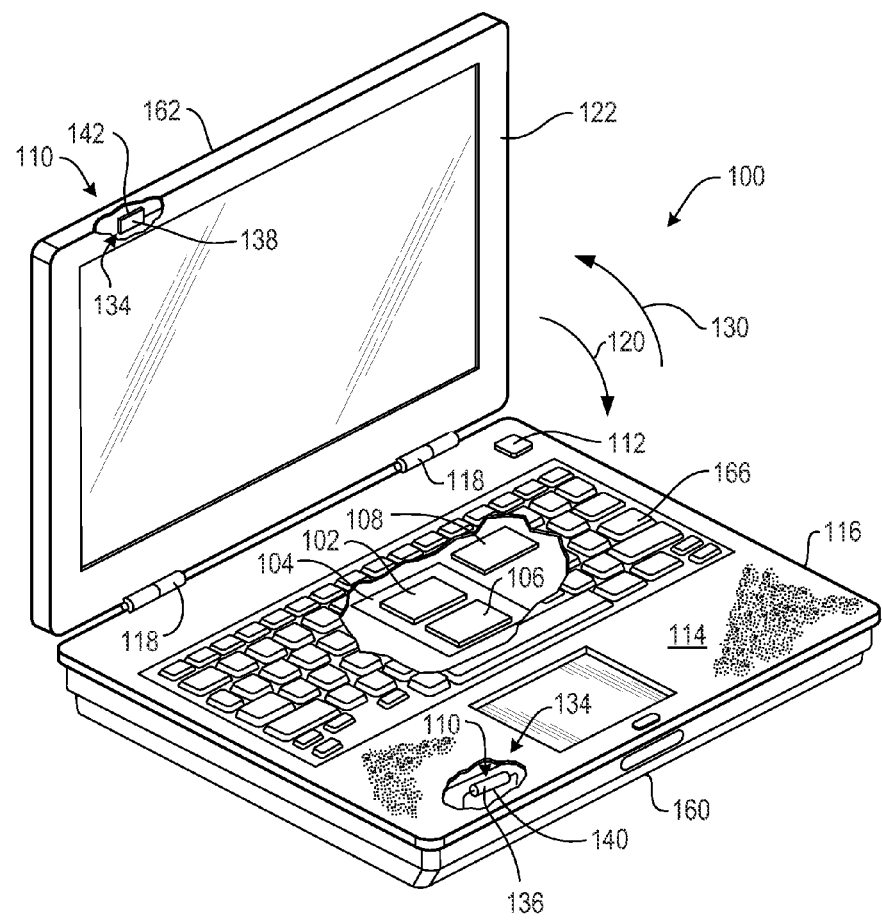
FIG. 2 is a front perspective view of a computer device employing another embodiment of a system for initiating execution of BIOS in accordance with an embodiment.

FIG. 2 is a front perspective view of computer device 100 employing another embodiment of initiating system 110. In the embodiment illustrated in FIG. 2, system 110 comprises a switch 134 that includes a sensor element 136 disposed in base member 116 and a sensor element 138 disposed in display member 122. In operation, switch 134 interrupts and/or transmits a signal generated and/or otherwise processed via hardware, software and/or a combination thereof of computer device 100 to terminate execution of BIOS 102 in response to sensor elements 136 and 138 being positioned within a predetermined distance and/or in close proximity to each other. Accordingly, when display member 122 is in the closed and/or in another predetermined arrangement or position relative to base member 116, computer device 100 can terminate execution of BIOS 102. In the embodiment illustrated in FIG. 2, sensor element 136 comprises a reed switch 140 and sensor element 138 comprises a magnet 142 such that reed switch 140 is actuated in response to a magnetic field generated by magnet 142. Accordingly, actuation of reed switch 140 causes the interrupt and/or the generated signal to initiate execution of BIOS 102. It should also be understood that the location and/or position of reed switch 140 and magnet 142 may be otherwise reversed (e.g., reed switch 410 located in display member 122 and magnet 142 located in base member 116). Additionally, it should be understood that other types of non-mechanical sensor elements may be used in switch 134 for detecting the positioning of display member 122 relative to base member 116.

Some embodiments may also provide automatic initiation of execution of BIOS 102. For example, in the embodiment illustrated in FIG. 2, in response to movement of display member 122 away from base member 116 and/or from a predetermined position or arrangement relative to base member 116, switch 134 is de-actuated (e.g., in response to sensor elements 136 and 138 moving away from each other as shown by arrow 130), thereby causing a signal to be generated and/or otherwise processed via hardware, software and/or a combination thereof of computer device 100 (e.g., via BIOS 102, OS 106 or other hardware and/or software-based component of computer device 100) to initiate execution of BIOS 102.

Sensor elements 136 and 138 can be positioned in a variety of locations on display member 122 and/or base member 116 to accommodate a variety of arrangements of display member 122 relative to base member to automatically initiate and/or terminate execution of BIOS 102. For example, in some embodiments, sensors 136 and 138 can be positioned to enable the computer device to automatically initiate and/or terminate execution of BIOS 102 when display member 122 is used in a tablet mode. For example, in some embodiments, sensor element 136 can be positioned in close proximity and/or near a bottom surface 160 of base member 116 and sensor element 138 is positioned in close proximity and/or near a rear surface 162 of display member 122. In such an embodiment, in response to display member 122 being rotated relative to base member 116 in direction 130 (e.g., rotating display member 122 away from a keyboard 166) to wrap or otherwise cause display member 122 to be positioned near or against bottom surface 160 of base member 116, thereby positioning display member 122 in a tablet mode, sensors elements 136 and 138 become positioned within a predetermined distance and/or in close proximity to each other, thereby causing termination of execution of BIOS 102. Correspondingly, in response to movement of display member 122 out of tablet mode (e.g., moving display member 122 away from bottom surface 160 of base member 116), movement of display member 122 away from a predetermined position and/or arrangement relative to base member 116 causes automatic initiation of execution of BIOS 102.

In yet other embodiments, sensor elements 136 and 138 can be positioned at multiple locations on display member 122 and/or base member 116 to automatically initiate and/or terminate execution of BIOS 102 in response to display member 122 being positioned at different positions and/or arrangements relative to base member 116. For example, in some embodiments, computer device 100 can be configured to enable use of display member 122 in a tablet mode while positioned near or against bottom surface 160 (e.g., rotation of display member in a direction opposite direction as described above) or in a tablet mode while positioned near or against keyboard 166 (e.g., rotation of display member about a vertical axis to reverse a direction of a display element of display member 122 to face away from keyboard 166). Thus, in some embodiments, sensor elements 136 and 138 can be positioned at one or more locations on base member 116 and one or more locations on display member 122 to automatically terminate execution of BIOS 102 when display member 122 is used in a tablet mode in any of a variety of arrangements relative to base member 116. Correspondingly, in response to movement of display member away from a predetermined tablet arrangement relative to base member 116, computer device 100 can automatically initiate execution of BIOS 102.

Figure 3:
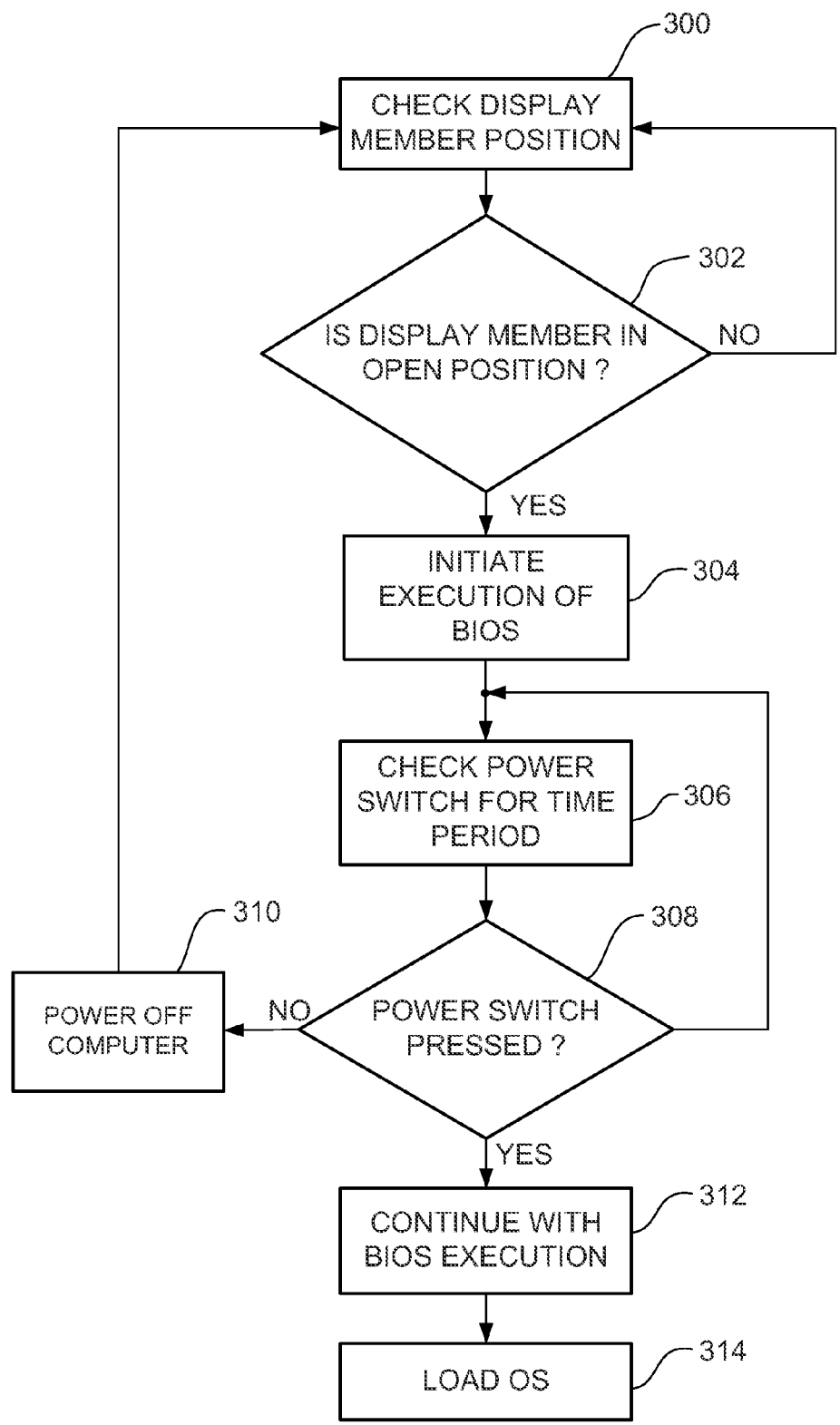
FIG. 3 is a flow diagram illustrating a process of initiating execution of BIOS in accordance with an embodiment.

FIG. 3 is a flow diagram illustrating an embodiment of a method of initiating execution of BIOS 102 in computer device 100. The method begins at block 300 in which computer device 100 checks the position and/or arrangement of display member 122 relative to base member 116. The method proceeds to decisional block 302, in which computer device 100 determines whether display member 122 is in an open position or closed position relative to based member 116. For example, referring to the embodiment shown in FIG. 1, if the display member 122 is rotated in the direction indicated by arrow 130 away from base member 116 to an open and/or predetermined position or arrangement relative to base member, display member 122 disengages button 126, thereby actuating switch 124. Actuation of switch 124 can cause an interrupt and/or other type of signal to be generated and processed by computer device 100. In this case, the display member is in the open position and the method can to block 304 in which the computer device 100 initiates execution of the BIOS 102.

On the other hand, continuing to refer to the embodiment shown in FIG. 1, if the display member 122 is rotated in the direction indicated by arrow 120 toward base member 116 to a closed and/or predetermined position or arrangement relative to base member, display member 122 approaches base member 116 and engages button 126, thereby actuating switch 124. Actuation of switch 124 can cause an interrupt and/or other type of signal to be generated and processed by computer device 100. In this case, if the BIOS 102 is in the process of execution, then the computer device 100 can terminate execution of BIOS 102 even after initiation of execution of BIOS. Furthermore, processing proceeds to block 300 in which the computer device 100 resumes checking for a change in the position of the display member 122 relative to the base member 116.

Once the computer device 100 has initiated the execution of the BIOS 102 at block 304, the method proceeds to block 306 in which the computer device can check the power switch 112 for a predetermined period of time. In one embodiment, the BIOS 102 can include instructions to set a timer to run for the predetermined period of time. The timer can also be implemented in hardware, software or a combination thereof. The method proceeds to decisional block 308, in which computer device 100 determines whether the power switch 112 has been depressed within the predetermined period of time. If the power switch 112 has been depressed within the predetermined period of time, then the method proceeds to block 312 in which the execution of the BIOS is completed. Once the BIOS completes execution, the method proceeds to block 314 in which the computer device can load the OS 106 into memory for execution. On the other hand, if the power switch 112 has been not depressed within the predetermined period of time, then the method proceeds to block 310 in which the computer device 100 is powered off. After the computer device 100 is powered off, the method proceeds to block 300 in which the computer device can resume checking for a change in the position of the display member 122.

The above discussion is meant to be illustrative of the principles and various embodiments. Numerous variations and modifications will become apparent to those skilled in the art once the above disclosure is fully appreciated. It is intended that the following claims be interpreted to embrace all such variations and modifications.

What is claimed is:

1. A computer device comprising:
   a display member coupled to a base member to enable variable positioning of the display member relative to the base member; and
   an initiating system comprising a first switch to transmit a signal indicative of the position of the display member relative to the base member to automatically initiate execution of a basic input/output system (BIOS) based on a position of the display member relative to the base member, wherein the initiation of the execution of the BIOS occurs before the computer device receives a signal from a power switch indicating that computer device is to be powered on, wherein the computer device is to be powered off if the signal from the power switch is not transmitted within a predetermined period of time after initiation of the execution of the BIOS, wherein the signal from the power switch is independent of the position of the display member relative to the base member.

2. The computer device of claim 1, wherein the computer device is powered off if the computer device does not receive a signal indicating that computer device is to be powered on within a predetermined period of time after initiation of the execution of the BIOS.

3. The computer device of claim 1, further comprising a power switch to transmit a signal indicating that the computer device is to be powered on, wherein the computer device initiates execution of an operating system (OS) if the signal is transmitted within a predetermined period of time after initiation of the execution of the BIOS.

4. The computer device of claim 1, wherein the initiating system comprises a switch to transmit a signal indicative of the position of the display member relative to the base member.

5. The computer device of claim , wherein the initiating system comprises a switch actuatable in response to the display member being proximally positioned relative to the base member.

6. The computer device of claim 1, wherein the initiating system comprises a switch actuatable in response to the display member being moved toward a closed position relative to the base member.

7. The computer device of claim 1, .wherein the initiating system comprises a magnet and a reed switch responsive to the magnet.

8. The computer device of claim 1, wherein the initiating system is configured to power off the computer device in response to the display member being positioned in close proximity to the base member.

9. The computer device of claim 1, wherein the initiating system is configured to automatically initiate execution of the BIOS in response to the display member being moved away from a predetermined position relative to the base member.

10. A method of initiating execution of a basic input/output system (BIOS) of a computer device having a display member coupled to a base member to enable variable positioning of the display member relative to the base member, the method comprising:

transmitting from a first switch a signal indicative of the position of the display member relative to the base member for initiating execution of the BIOS based on a position of the display member relative to the base member, wherein the initiating execution of the BIOS occurs before the computer device receives a signal indicating that computer device is to be powered on; and powering off the computer device if the computer device does not receive a signal from a power switch indicating that computer device is to be powered on within a predetermined period of time after initiation of execution of the BIOS, wherein the signal from the power switch is independent of the position of the display member relative to the base member.

11. The method of claim 10, further comprising powering off the computer device in response to the display member being positioned in close proximity to the base member.

12. The method of claim 10, wherein initiating execution of the BIOS occurs in response to the display member being moved away from a predetermined position relative to the base member.

13. A computer-readable medium storing instructions that, when executed by a computer device having a display member coupled to a base member to enable variable positioning of the display member relative to the base member, causes the computer device to:

transmit from a first switch a signal indicative of the position of the display member relative to the base member to initiate execution of a basic input/output system (BIOS) of the computer device based on a position of the display member relative to the base member, wherein the initiating execution of the BIOS occurs before the computer device receives a signal indicating that computer device is to be powered on; and power off the computer device if the computer device does not receive a signal from a power switch indicating that computer device is to be powered on within a predetermined period of time after initiation of the execution of the BIOS, wherein the signal from the power switch is independent of the position of the display member relative to the base member.

14. The computer-readable medium of claim 13, further comprising instructions that when executed cause the computer device to power off the computer device if a signal indicating that the computer device is to be powered is not received within a predetermined period of time after initiation of the BIOS.

15. The computer-readable medium of claim 13, further comprising instructions that when executed cause the computer device to initiate execution of the BIOS in response to the display member being moved away from a predetermined position relative to the base member.

* * * * *

UNITED STATES PATENT AND TRADEMARK OFFICE
CERTIFICATE OF CORRECTION

PATENT NO.       : 8,489,870 B2
APPLICATION NO.  : 12/910680
DATED            : July 16, 2013
INVENTOR(S)      : Lan Wang et al.

Page 1 of 1

It is certified that error appears in the above-identified patent and that said Letters Patent is hereby corrected as shown below:

In the Claims:

In column 7, line 20, in Claim 5, delete "claim ," and insert -- claim 1, --, therefor.

In column 7, line 28, in Claim 7, delete ".wherein" and insert -- wherein --, therefor.

Signed and Sealed this
Twenty-sixth Day of November, 2013

Margaret A. Focarino
*Commissioner for Patents of the United States Patent and Trademark Office*